(No Model.)
R. LUDERS.
BRAKE FOR AXLES.
No. 374,607. Patented Dec. 13, 1887.
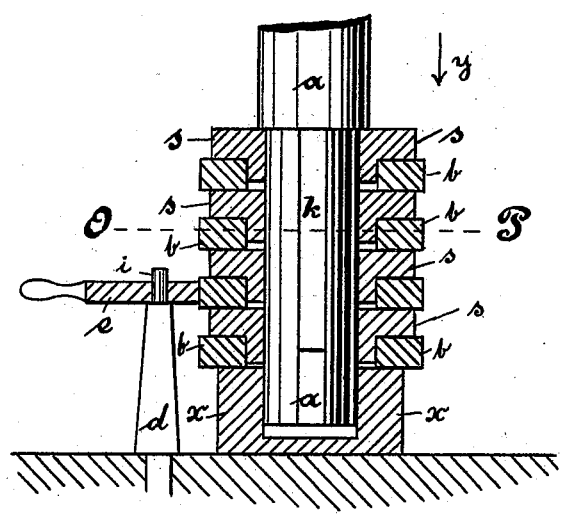
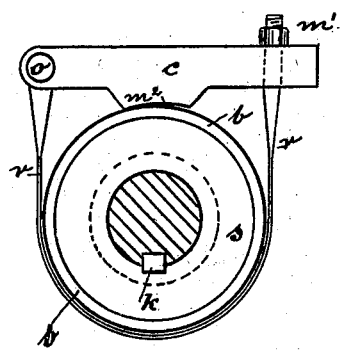
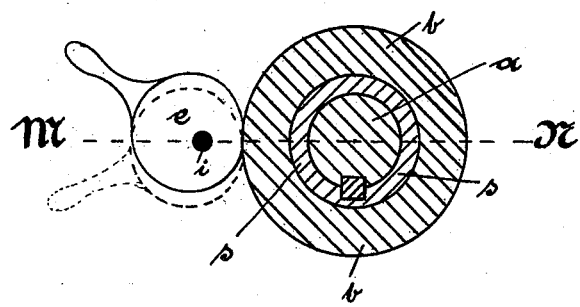
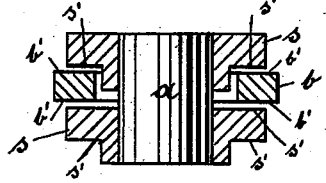
Witnesses:
A. Brücke.
O. Kühner.
Inventor:
Reinhold Lüders
by R. Deissler
attorney

UNITED STATES PATENT OFFICE.

REINHOLD LÜDERS, OF BERLIN, GERMANY, ASSIGNOR TO LOUIS HENSCHEL, OF SAME PLACE.

BRAKE FOR AXLES.

SPECIFICATION forming part of Letters Patent No. 374,607, dated December 13, 1887.

Application filed April 18, 1887. Serial No. 235,165. (No model.) Patented in Germany December 30, 1884, No. 38,820; in England July 22, 1885, No. 8,855; in Austria-Hungary July 22, 1885, No. 27,263 and No. 54,995, and in Belgium August 11, 1885, No. 69,877.

*To all whom it may concern:*

Be it known that I, REINHOLD LÜDERS, a subject of the King of Prussia, German Emperor, and a resident of Berlin, in the Kingdom of Prussia, Germany, have invented new and useful Improvements in Brakes for Axles with Longitudinal Pressure, (for which I have obtained a patent in Germany, No. 38,820, December 30, 1884; in England, No. 8,855, July 22, 1885; in Austria-Hungary, Nos. 27,263 and 54,995, July 22, 1885, and in Belgium, No. 69,877, August 11, 1885,) of which the following is a specification.

The improvements described hereinafter relate to a braking apparatus for shafts which rotate under longitudinal pressure.

The improvements consist in applying to such shafts disks that cannot turn, but can be displaced longitudinally on the shafts, in combination with loose disks placed between them and provided with braking contrivances. The longitudinal pressure on the shaft presses the first-named disks against the loose and last-named disks, and as the last-named disks can be held fast whenever desirable the rotating of the shaft can be checked and impeded as may be found necessary.

This contrivance can be applied to all machines in which the shafts work under longitudinal pressure, and it serves to retard the rotation of the said shafts. Thus, for instance, it may be used on cranes, pulleys, &c., with which heavy loads have to be lowered slowly.

The improvements are represented in Figures I to III. Fig. I shows a section M N, and Fig. II a section O P; Fig. III shows a view from above of the contrivance with a modified braking apparatus, the shaft being cut through. Fig. IV shows a section M N through the disks, (the shaft in view,) which are removed from one another to show clearly the friction-planes.

The contrivance consists in the disks $s$, mounted on the shaft $a$, and made longitudinally displaceable on the latter. These disks are connected by the wedge $k$ with the shaft $a$, and are forced to rotate with the latter. The loose disks $b$ are mounted between the disks $s$ and are placed centrically on the disks $s$. There is therefore always one of the loose disks $b$ between two of the disks $s$ that rotate with the shaft $a$. By friction and by the axial pressure the disks $o$ are naturally carried along and round by the disks $s$. The shaft $a$ is weighted in the axis of revolution, (arrow $y$.) The axial pressure of the shaft is taken up by the bush $x$ of the axle.

If the rotary motion of a shaft weighted in the axis of revolution has to be checked or ceased, it is done by holding fast the loose disks $b$, placed between the disks $s$, or, in other words, by making them act as brakes. Friction then ensues between the annular surfaces $b'$ of $b$ and the annular surfaces $s'$ of $s$. By this friction a retarding of the rotary motion of the shaft $a$ is produced.

As each of the loose disks $b$ is provided with a braking apparatus, as many of them may be used as brakes as may be necessary to check the rotation of the shaft $a$. The frictional surfaces $s'$ $b'$ increase or decrease in the same ratio as the number of the brakes, and consequently cause more or less friction.

It must be mentioned that the frictional surfaces proper are the face sides of all the disks, and the motion of the disks $b$ may be retarded to a greater or less extent by the eccentrics, and when the disks $b$ are thus retarded the friction between the latter and the disks $s$ will finally stop the rotary motion of the disks, and consequently that of the shaft, as they are firmly connected to the shaft. The wear and tear of all these surfaces is quite uniform. The braking effect can be increased by making all the disks as thin as possible and by using a great number of them. The disks $s$ $s$ are always kept apart by the disks $b$ $b$—that is to say, the disk $s$ leans against the disk $b$ without touching the next disk $s$. Any kind of stopping or braking contrivances may be applied to these disks $b$.

In Figs. I and II an eccentric, $e$, mounted on a support, $d$, is used as a stopping apparatus. By turning it on its axle $i$ it can be pressed against the loose disk $b$, which it clutches at once. In this arrangement, Fig. I, a special stopping contrivance (eccentric $e$)

is used for each separate disk $b$; but only one is represented in the drawings.

Fig. III shows that in the place of the stopping contrivance represented in Fig. I a common strap-brake can be used for holding fast the disk $b$. $r$ is the strap-brake, which is fastened in the well-known way on the one side to the pin $o$ and on the other side to the lever $c$, the fulcrum of which is at $o$. By means of a screw, $m'$, the strap of $r$ is shortened in the well-known way, by which means the strap-brake $r$ itself and the lever $c$, with its part $m$, are pressed against the loose disk $b$, and the latter is held fast.

Having fully described my invention, what I claim, and desire to secure by Letters Patent of the United States, is—

Braking apparatus consisting of the rotating disks $s$, movable longitudinally on the shaft, and the disks $b$ between the disks $s$, in combination with means for braking the disks $b$, for the purpose specified.

In witness whereof I have hereunto set my hand in presence of two witnesses.

REINHOLD LÜDERS.

Witnesses:
O. MÜHLNER,
B. ROI.